(12) United States Patent
Byrd

(10) Patent No.: US 7,178,401 B2
(45) Date of Patent: Feb. 20, 2007

(54) THREE AXIS ACCELEROMETER WITH VARIABLE AXIS SENSITIVITY

(75) Inventor: Douglas S. Byrd, Carson City, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/105,474

(22) Filed: Apr. 14, 2005

(65) Prior Publication Data

US 2006/0230829 A1 Oct. 19, 2006

(51) Int. Cl.
*G01P 15/10* (2006.01)

(52) U.S. Cl. .................................. 73/514.29; 73/510

(58) Field of Classification Search ............. 73/514.29, 73/514.33, 514.36, 514.38, 514.21, 514.24, 73/510, 511, 504.02, 504.04, 1.37
See application file for complete search history.

(56) References Cited

U.S. PATENT DOCUMENTS

| | | | |
|---|---|---|---|
| 3,002,391 A * | 10/1961 | Holmes | ................... 73/514.29 |
| 3,057,208 A | 10/1962 | Bedford | |
| 3,238,789 A | 3/1966 | Erdley | |
| 3,382,724 A | 5/1968 | Wilcox | |
| 4,215,570 A | 8/1980 | Eer Nisse | |
| 4,398,417 A | 8/1983 | Shutt | |
| 5,531,115 A | 7/1996 | Erdley | |
| 5,962,788 A | 10/1999 | Fawcett | |
| 6,826,960 B2 | 12/2004 | Schaad et al. | |
| 2004/0025590 A1 | 2/2004 | Schaad et al. | |

* cited by examiner

*Primary Examiner*—Helen Kwok
(74) *Attorney, Agent, or Firm*—Nixon & Vanderhye, PC

(57) ABSTRACT

The accelerometer includes an inertial mass, a fixed base and at least one or more supports/sensors for supporting the mass from the base rendering the support system statically indeterminate. The supports/sensors are preferably double-ended dual beam tuning forks suspended between mounting pads and vibrated by an oscillator. By adding one or more supports/sensors beyond those supports/sensors necessary for a statically determinate support system, the support system is rendered statically indeterminate and therefore sensitive in one or more directions.

18 Claims, 4 Drawing Sheets

THREE AXIS ACCELEROMETER WITH VARIABLE AXIS SENSITIVITY

BACKGROUND OF THE INVENTION

The present invention relates to accelerometers in general and particularly to a crystal-based three axis accelerometer in a unitary package with the capability of varying sensor axis sensitivity in any given direction.

Navigational instrumentation using accelerometers is used in many different environments. For example, down-hole oil exploration tools typically employ three independent single axis sensors for determining acceleration. The single axis sensors, however, disadvantageously occupy substantial space in the exploration tool. Further, most current single axis sensors are force-balanced servo accelerometers using a magnetically restored proof mass and therefore produce a magnetic influence on their surroundings. The inertial navigational instrumentation, however, also includes magnetometers. The potential interaction between the highly magnetic accelerometers and the magnetometers requires the accelerometers to be placed a minimum distance from the magnetometers. Further, quartz crystal-based resonators have previously been employed in sensors and have been proposed for use in tri-axis accelerometers. For example, see U.S. Pat. No. 6,826,960. The tri-axis accelerometer of that patent involves a statically determinant system that does not afford sensitivity or enable variable sensitivity in any one or more directions without having to modify the individual crystals size or shape. Accordingly, there is a need for an improved tri-axis accelerometer having variable axis sensitivity capability which can utilize one standard support system (i.e., a support crystal).

BRIEF DESCRIPTION OF THE INVENTION

In a preferred embodiment of the invention, there is provided a sensor for measuring acceleration in three dimensions, comprising an inertial mass and a support system for the inertial mass, the support system including a base and a plurality of support members extending between the base and the inertial mass to suspend the inertial mass in orthogonal directions providing a statically indeterminate structure; and stress sensors for measuring the acceleration induced stress in the support members thereby affording a measure of acceleration of the mass.

In another preferred embodiment, there is provided an accelerometer comprising an inertial mass and a support system for the inertial mass, the support system including a base and a plurality of support members extending between the base and the inertial mass to suspend the inertial mass in orthogonal directions providing a statically indeterminate structure; and at least six of the support members constituting respective stress sensors for measuring the acceleration induced stress in the support members to provide a measure of acceleration of the mass.

DETAILED DESCRIPTION OF THE INVENTION

Figure 1:
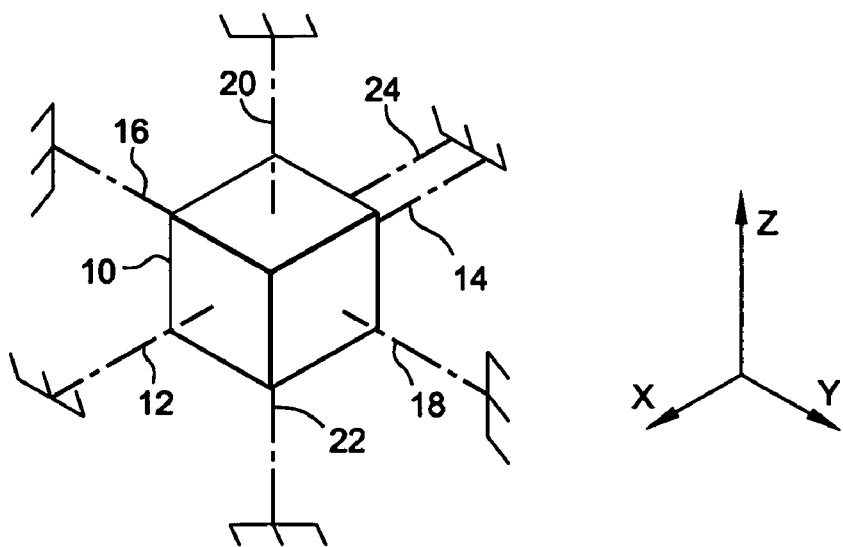
FIG. 1 is a schematic illustration of a proof mass supported by sensors in orthogonal directions affording a statically indeterminate structure.

In FIG. 1, there is schematically illustrated an inertial mass 10 represented by the illustrated cube. It will be appreciated, however, that the mass 10 may have any geometrical configuration. For illustrative purposes, the mass 10 is supported by six orthogonally-related supports, namely supports 12, 14; 16, 18; and 20, 22. There is also an additional support 24. The opposite ends of each support are fixed to the mass 10 and to a fixed immovable supporting base which, for example, may comprise a housing for an accelerometer. As illustrated, supports 12,14; 16,18; 20,22 are arranged coincident with the respective X, Y and Z axes of a Cartesian coordinate system. The support system for the mass 10 as illustrated includes seven supports and therefore constitutes a statically indeterminate support system. Particularly, if the mass 10 is supported solely by the six supports 12,14; 16,18; 20,22, the static system of support is a statically determinate support structure. A system is a statically determinate structure when the number of unknown forces equals the number of equations of motion necessary to describe the motion of the mass in free space. That is, the supports or restraints are equal to the number and types of degrees of freedom and are independent. Thus, it is possible in a statically determinate system to determine all axial forces in the supports and all reactions at the supports by solving equilibrium equations.

In contrast, a support system is statically indeterminate, as here, when there are more constraints than required to have an independent statically determinate structure, i.e., there are more supports than required to independently balance the external loads. Stated differently, a system is statically indeterminate where the restraints exceed the number of degrees of freedom, and there is at least one restraint for each degree of freedom, e.g., translational relative to and rotation about the X, Y and Z axes. The solution of statically indeterminate structure dynamics requires more than solving the equations of static equilibrium and particularly requires further knowledge of the support system's properties.

With the foregoing definitions in mind, it will be appreciated that the support system for the mass 10 illustrated in FIG. 1 with the six supports 12,14; 16,18; 20,22 arranged orthogonally relative to one another constitute a statically determinate support system. The support system illustrated in FIG. 1, however, with seven supports including the additional support 24 constitutes a statically indeterminate support system. That is, there is at least one more support than required to independently balance the external loads. A statically indeterminate system also embraces additional supports than the single additional support illustrated in FIG. 1 and may be characterized by a statically determinate support system with at least one or more additional supports.

Figure 2:
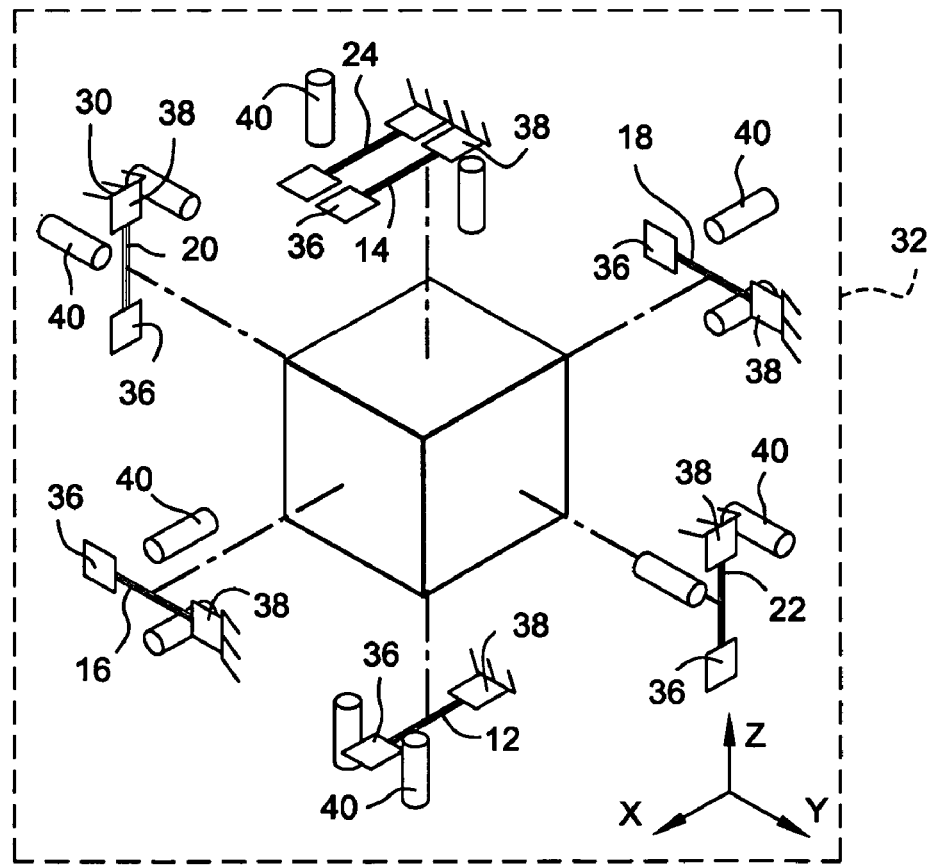
FIG. 2 is a schematic illustration of an accelerometer module illustrating the inertial mass, sensors, fixed support and stops of the statically indeterminate structure.
Figure 3:
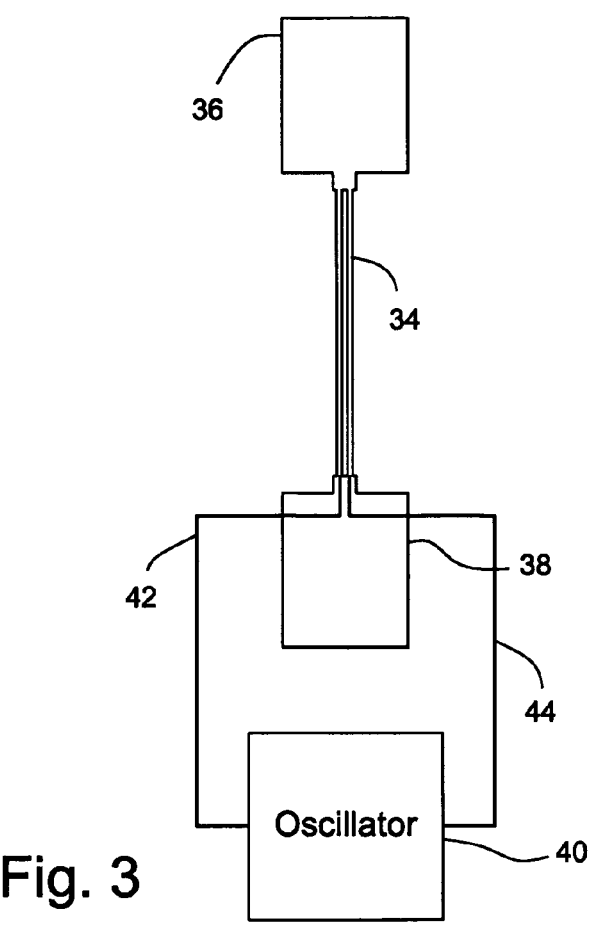
FIG. 3 is a schematic illustration of a quartz crystal dual beam double-ended tuning fork employed as a support/sensor in an aspect of the present invention.
Figure 4:
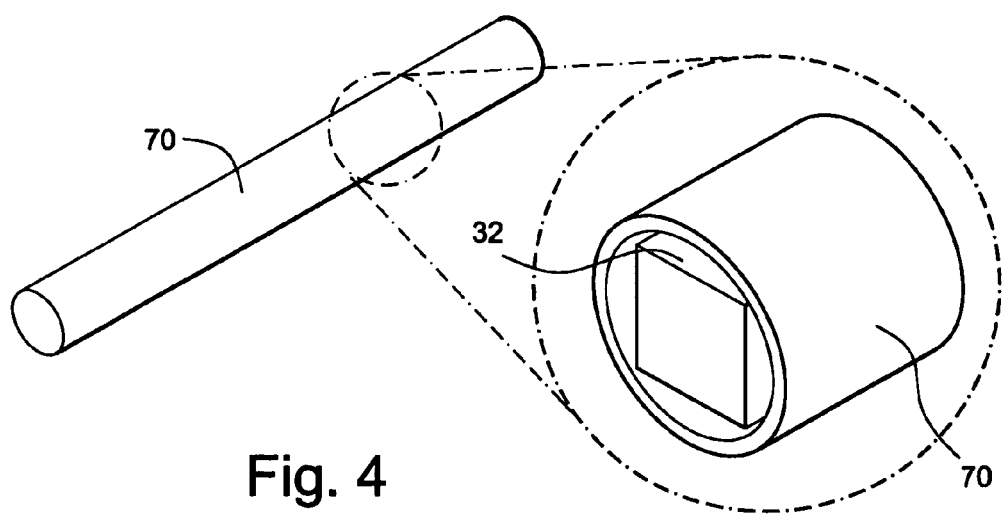
FIG. 4 is a schematic illustration of a down-hole, oil drilling exploration tool embodying a tri-axial accelerometer in accordance with a preferred aspect of the present invention.
Figure 5:
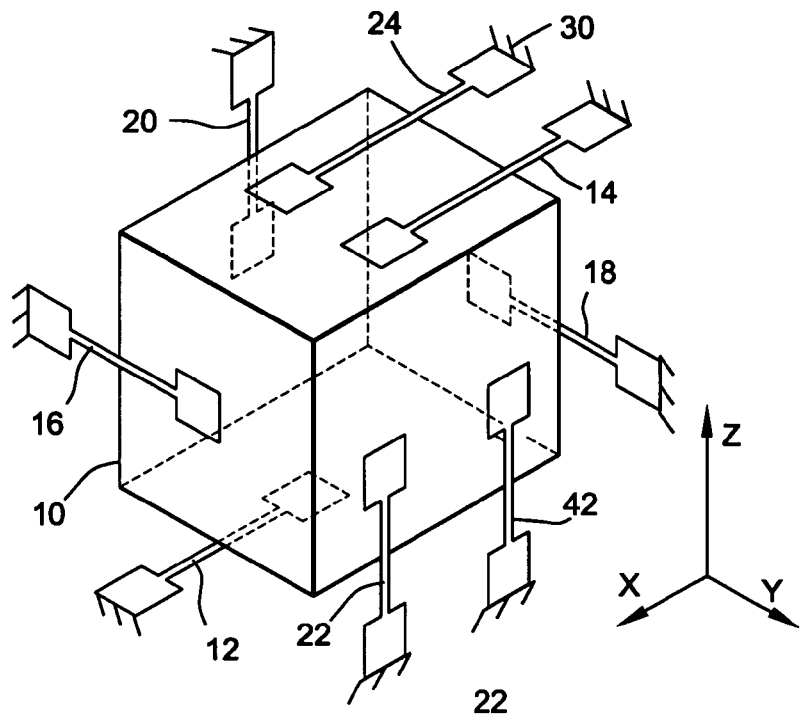
FIGS. 5–8 are schematic illustrations of various embodiments illustrating supports for the inertial mass in various statically indeterminate structures.

An aspect of the present invention provides a support system for an inertial mass having supports which extend between a fixed base and the inertial mass in orthogonal directions in a statically indeterminate support structure. For example, as illustrated in FIG. 2 which essentially illustrates the same support system illustrated by the seven supports of FIG. 1 at a more detailed level, each support may comprise any one of a number of different force-sensitive responsive sensors. For example, stress detection devices such as strain gauges may be utilized. As another example, single beam resonator systems such as disclosed in FIG. 3A of U.S. Pat. No. 6,826,960 may be employed. Preferably, however, dual beam double-ended tuning forks (DETF) provide the support/sensor between the mass 10 and the fixed base and which base may comprise a housing 30 for an accelerator module 32. An example of the dual beam double-ended tuning fork 34 is illustrated in FIG. 3. Mounting pads 36 and 38 are provided at opposite ends of the DETF force-sensitive support/sensor. An oscillator 40 is electrically connected by lead lines 42 and 44 to electrical connections on the pad 38 whereby the oscillator provides the electrical energy to vibrate the beams of the sensor 34. Consequently, as the dual beams of the support structure undergo tension or compression in opposition to linear forces and angular rotation caused by acceleration of the mass 10, the frequencies of the oscillations vary with the load and hence are proportional to, i.e., a measure of acceleration. Strain gauges can be used in a similar manner to provide a signal output proportional to acceleration.

Referring back to FIG. 2, the force-sensitive supports 12,14,24; 16,18; and 20,22 illustrated schematically in FIG. 1 constitute in the preferred embodiment respective force-sensitive dual beam double-ended tuning forks 34 connected between the mass 10 and the fixed base 30. Thus, in FIG. 2, one of the pads, e.g., 36, on each support/sensor 34 is secured to the inertial mass 10 while an opposite pad, e.g., 38, is secured to the fixed based 30. Particularly, supports/sensors 12,14 provide support in the X direction; supports/sensors 16,18 provide support in the Y direction; and supports/sensors 20,22 provide support in the Z direction. Additional support/sensor 24 provides further support in the X direction and hence further stiffness in the X direction. This additional support renders the support system of FIG. 2 statically indeterminate. As noted below in the further illustrations, one or more additional supports may be added to statically determinative support systems to render the support systems statically indeterminate.

It will also be appreciated that the additional support need not constitute a load sensitive support. Therefore, to provide a statically indeterminate structure in the context of the present accelerometer, a minimum of one load sensitive support is required for each degree of freedom in conjunction with one or more additional supports. Each additional support may or may not be load sensitive, e.g., one or more additional supports may be entirely structural.

Also illustrated in FIG. 2 are six stops 40. The stops are illustrated in pairs in each of the six orthogonal directions. The stops 40 are carried by the base 30 and preclude movement of the inertial mass distances in orthogonal directions beyond the capacity of the stress sensors to measure the acceleration-induced stress in the support members. It will be appreciated that the arrangement and number of the stops on the six sides may vary, e.g., four on the corners or six (four corners and two in the middle) and that the specifically disclosed arrangement and number is exemplary only.

Referring to FIGS. 1 and 2, the statically indeterminate support structure for the inertial mass 10 enables the sensitivity of the accelerometer to be varied in any given direction or directions. By providing statically indeterminate supports, the rigidity of the accelerometer vis-a-vis the support base 30 can be increased in any one or more directions. This has the advantage of increasing the natural frequency of the support system which is highly desirable, for example, in the low vibration environment of down-hole oil exploration tools. As a specific example, oil exploration equipment preferably requires an accelerometer to have a natural frequency in excess of about 1500 Hz. In the illustrated embodiment, the additional support/sensor 24 is in the X direction parallel to the X axis and hence provides increased stiffness in that direction. Consequently, with the statically indeterminate structure, specific sensitivity in one or more directions to provide a variation of sensitivity along any given axis is accomplished by adding one or more additional supports/sensors, e.g., the dual beam double-ended tuning forks on a given side or sides of the mass. This affords the additional advantage that the supports/sensors would employ one basic dual beam resonator and an accelerometer manufacturer would not have to manufacture multiple sizes of dual beam resonators, which would be more expensive.

Referring to FIGS. 5–8, it will be appreciated that the statically indeterminate support system can be arranged in many different configurations to support the inertial mass from the fixed base. Thus, the statically indeterminate support systems specifically described and illustrated herein are considered representative and not limiting. Many other combinations of supports than specifically disclosed herein can be utilized depending upon the intended use. Accordingly, in FIG. 5, three supports/sensors 12,14,24 are illustrated interconnected between the inertial mass 10 and the fixed base 30 in the X direction. Two supports/sensors 16,18 are fixed between the inertial mass 10 and the fixed base 30 in the Y direction. Three supports/sensors 20,22,42 are fixed between the mass 10 and the fixed base 30 in the Z direction. That is, the otherwise statically determinant support system comprised of supports/sensors 12,14; 16,18; 20,22 has been augmented by two additional sensors/supports 24, 42 in the X and Z directions rendering the support system statically indeterminate. Also, the sensitivity of the accelerometer is stiffened in the X and Z directions.

Figure 6:
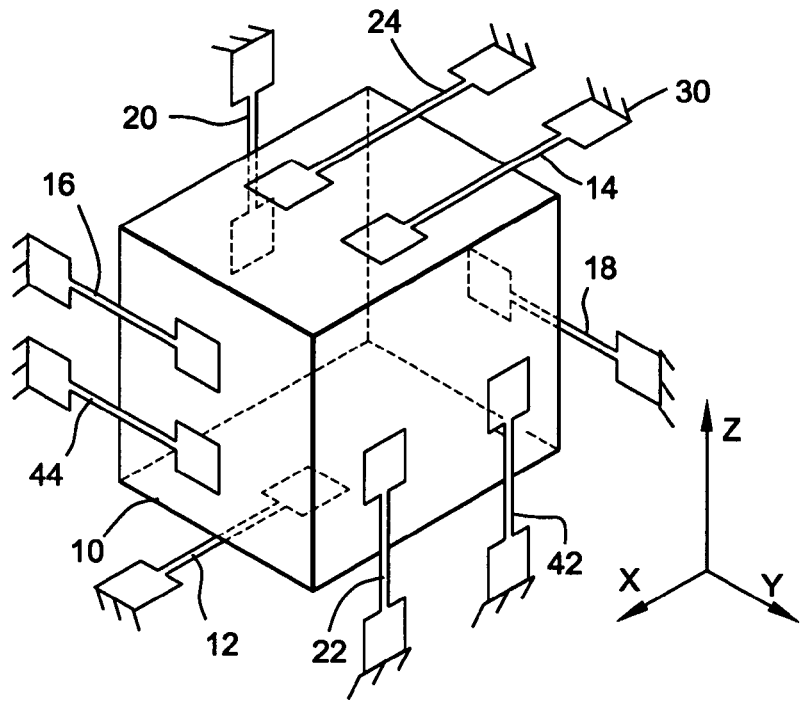

In FIG. 6, three sensors/supports 12,14,24 extend between the inertial mass 10 and the fixed support 30 in the X direction, three supports/sensors 16,18,44 extend in the Y direction, and three supports/sensors 20,22,42 extend in the Z direction for a total of nine supports/sensors. Thus, three supports/sensors are provided in orthogonal directions in excess of an otherwise statically determinative support system rendering the support system statically indeterminate.

Figure 7:
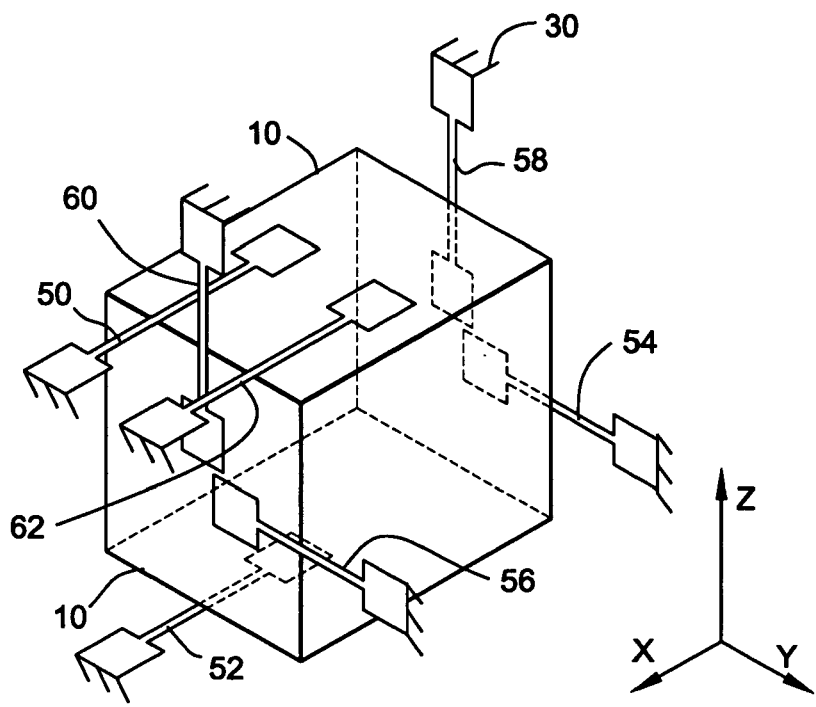

Referring to FIG. 7, it will be appreciated that the statically indeterminate support system need not provide supports/sensors extending between the inertial mass and the base along axes coincident with or parallel to the six axes of the X, Y, Z Cartesian coordinate system provided that the one or more additional supports/sensors renders the otherwise statically determinate support system structure statically indeterminate. Thus, in FIG. 7, the supports/sensors include supports/sensors 50,52,62 extending in the positive X direction; supports/sensors 54,56 extending in the positive Y direction; and supports/sensors 58, 60 extending in the positive Z direction. No supports extend between the mass 10 and the base 30 in the negative X, Y and Z directions. It will be appreciated that the foregoing supports/sensors 50, 52; 54, 56; 58, 60 provide a statically determinate support system for the mass 10. The addition of one or more sensors/supports, for example, the addition of sensor/support 62 in the positive X direction renders the support system statically indeterminate. The support system of FIG. 7 therefore has an increased stiffness in the X direction.

Figure 8:
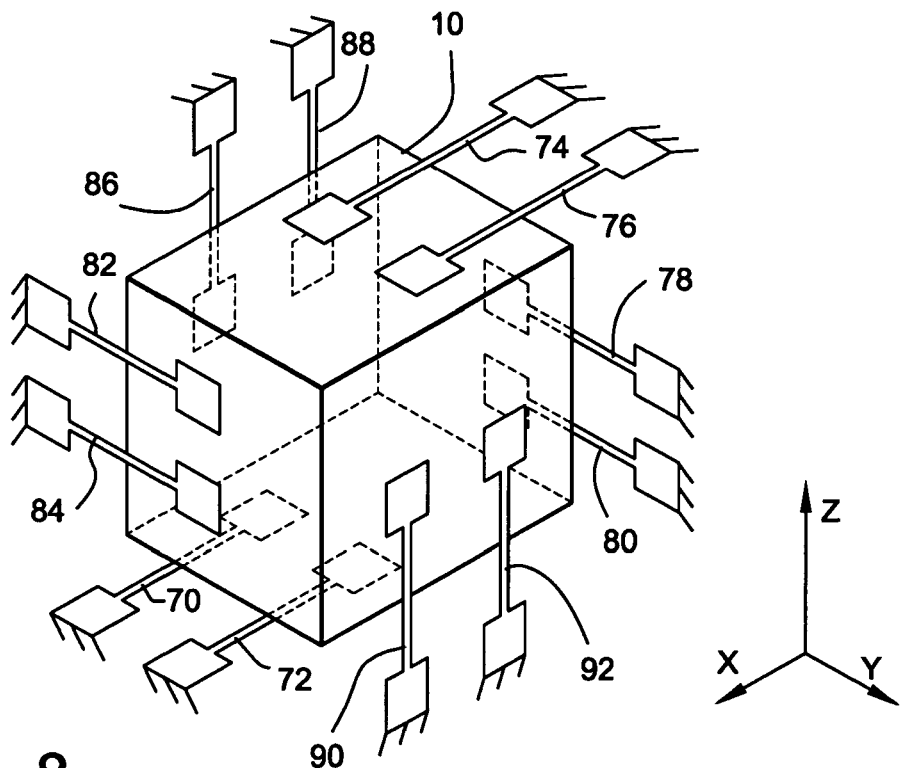

Referring to FIG. 8, pairs of support sensors extend in both positive and negative directions of the Cartesian coordinate system. Thus, in the statically indeterminate support system of FIG. 8, the supports/sensors include supports/sensors 70, 72 and 74, 76 extending in the respective positive and negative X directions; supports/sensors 78, 80 and 82, 84 extending in the respective positive and negative directions; and supports/sensors 86, 88 and 90, 92 extending in the respective positive and negative Z directions. The addition of one or more sensors/supports beyond the necessary six supports, renders the support system statically indeterminate. The support system of FIG. 8 therefore has an increased stiffness in the X, Y and Z directions and provides higher load/usable load ranges in any given direction. From the foregoing, it will be appreciated that the tri-axial accelerometer of the present invention utilizes the addition of one or more supports/sensors in addition to the supports/sensors which render the support system statically determinate.

Referring to FIG. 3, there is illustrated an oil exploration tool 70 which may incorporate an accelerometer module 32 of the present invention. For example, the module 32 may be disposed within the cylindrical casing of the tool 70. The module 32 houses the fixed base 30 and the statically indeterminate support system for the inertial mass in a manner which is compact, and easy to install and integrate into the electronics of the navigational exploration tool 70.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A sensor for measuring acceleration in three dimensions, comprising:
   an inertial mass and a support system for the inertial mass, said support system including a base and a plurality of support members extending between said base and said inertial mass, and sufficient in number to suspend the inertial mass in orthogonal directions and to provide a statically indeterminate structure; and
   stress sensors for measuring the acceleration induced stress in the support members thereby affording a measure of acceleration of the mass.

2. A sensor according to claim 1 wherein said plurality of support members includes at least seven support members between said base and said inertial mass.

3. A sensor according to claim 1 wherein said plurality of support members include pairs of support members extending between said base and said inertial mass in said orthogonal directions respectively, individual support members of each pair of support members extending parallel to one another, said plurality of support members further including another support member extending between said base and said inertial mass in one of said orthogonal directions to provide a stiffness in said one orthogonal direction in excess of the stiffness in other orthogonal directions.

4. A sensor according to claim 1 wherein individual support members of said plurality of support members extend from opposite sides of said mass generally parallel to said orthogonal directions.

5. A sensor according to claim 1 wherein said plurality of support members include pairs of support members extending between said base and said inertial mass in said orthogonal directions respectively, individual support members of each pair of support members extending parallel to one another, at least one of the plurality of support members affording a sensitivity to applied acceleration in one of said orthogonal directions different than a sensitivity to applied acceleration in at least another of said orthogonal directions.

6. A sensor according to claim 5 wherein said one support member is a support member in addition to three pairs of support members otherwise rendering the support system statically determinative.

7. A sensor according to claim 6 wherein individual support members of each pair of said support members extend from opposite sides of said mass.

8. A sensor according to claim 1 wherein said plurality of support members include pairs of support members extending between said base and said inertial mass in said orthogonal directions respectively, individual support members of each pair of support members extending parallel to one another and from respective opposite sides of said mass, said plurality of support members further including at least two additional support members between said inertial mass and said base in two of the orthogonal directions, respectively to provide stiffness in said two orthogonal directions in excess of the stiffness and in another orthogonal direction.

9. A sensor according to claim 1 wherein each of said support members includes a quartz crystal beam resonator.

10. A sensor according to claim 1 wherein each of said support members includes a quartz crystal dual beam resonator.

11. A sensor according to claim 1 wherein said support members are configured to afford a sensitivity to applied acceleration in one of said orthogonal directions different than a sensitivity to applied acceleration in at least another of said orthogonal directions.

12. A sensor according to claim 1 wherein said base carries a plurality of stops to preclude movement of said inertial mass distances in said orthogonal directions beyond the capacity of the stress sensors to measure the acceleration induced stress in the support members.

13. An accelerometer comprising:
   an inertial mass and a support system for the inertial mass, said support system including a base and a plurality of support members extending between said base and said inertial mass, and sufficient in number to suspend the inertial mass in orthogonal directions and to provide a statically indeterminate structure; and
   at least six of said support members constituting respective stress sensors for measuring the acceleration induced stress in the support members to provide a measure of acceleration of the mass.

14. An accelerometer according to claim 13 wherein said plurality of support members includes at least seven support members between said base and said inertial mass.

15. An accelerometer according to claim 13 wherein said plurality of support members include pairs of support members extending between said base and said inertial mass in said orthogonal directions respectively, individual support members of each pair of support members extending parallel to one another, said plurality of support members further including another support member extending between said base and said inertial mass in one of said orthogonal directions to provide a stiffness in said one orthogonal direction in excess of the stiffness in other orthogonal directions.

16. An accelerometer according to claim 13 wherein individual support members of said plurality of support members extend from opposite sides of said mass generally parallel to said orthogonal directions.

17. An accelerometer according to claim 13 wherein said six support members constitute pairs thereof with the support members of each pair extending parallel to one another.

18. An accelerometer according to claim 17 wherein the pairs of support members extend in positive or negative orthogonal directions in an X, Y, Z Cartesian coordinate system.

* * * * *